(12) United States Patent
Kutzner et al.

(10) Patent No.: US 10,486,666 B2
(45) Date of Patent: Nov. 26, 2019

(54) METHOD FOR DETERMINING A POSITION AND/OR CHANGE IN POSITION OF A HYDRAULIC PUMP OF A MOTOR VEHICLE BRAKE SYSTEM AND MOTOR VEHICLE BRAKE SYSTEM

(71) Applicant: Continental Teves AG & Co. oHG, Frankfurt (DE)

(72) Inventors: Michael Kutzner, Sulzbach (DE); Micha Heinz, Darmstadt (DE); Jan Truoel, Griesheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 318 days.

(21) Appl. No.: 15/432,229

(22) Filed: Feb. 14, 2017

(65) Prior Publication Data

US 2017/0217413 A1   Aug. 3, 2017

Related U.S. Application Data

(63) Continuation of application No. PCT/EP2015/067243, filed on Jul. 28, 2015.

(30) Foreign Application Priority Data

Aug. 14, 2014   (DE) .......... 10 2014 216 230

(51) Int. Cl.
*B60T 17/02* (2006.01)
*B60T 8/40* (2006.01)
(Continued)

(52) U.S. Cl.
CPC ............ *B60T 8/4022* (2013.01); *B60T 8/172* (2013.01); *B60T 8/404* (2013.01); *B60T 13/662* (2013.01); *B60T 17/02* (2013.01)

(58) Field of Classification Search
CPC .. F04B 17/03; F04B 17/05; F04B 49/06–065; F04B 49/103; F04B 51/00;
(Continued)

(56) References Cited

U.S. PATENT DOCUMENTS 7,047,119 B2 * 5/2006 Fey .......................... B60T 8/36
307/9.1
9,346,449 B1   5/2016 Chen
(Continued)

FOREIGN PATENT DOCUMENTS

CN   102387949 A   3/2012
CN   102548818 A   7/2012
(Continued)

OTHER PUBLICATIONS

German Search Report dated Aug. 12, 2015 for corresponding German Patent Application No. 10 2014 216 230.0.
(Continued)

*Primary Examiner* — McDieunel Marc

(57) ABSTRACT

A method for determining a position of a hydraulic pump includes determining the position and/or change of position of the hydraulic pump based on a current and/or voltage measurement signal as well as a frequency of the measurement signal. The method also includes utilizing the determined position and/or changing of position of the hydraulic pump for actuating the electrical machine.

9 Claims, 3 Drawing Sheets

(51) Int. Cl.
 B60T 13/66 (2006.01)
 B60T 8/172 (2006.01)

(58) Field of Classification Search
 CPC . F04B 2203/0201–0214; B60T 8/4022; B60T 8/172; B60T 8/404; B60T 13/662; B60T 17/02; G01P 3/48; G01P 3/4802; G01P 3/4805; G01P 3/4807; G01P 3/481; G01P 3/4815
 USPC .... 303/10; 417/22, 42, 44.1, 44.11, 45, 231, 417/410.1; 388/800–824
 See application file for complete search history.

(56) References Cited

U.S. PATENT DOCUMENTS

| | | | | |
|---|---|---|---|---|
| 9,873,417 | B2* | 1/2018 | Kutzner | B60T 8/405 |
| 2004/0075339 | A1* | 4/2004 | Volz | B60T 8/368 |
| | | | | 303/116.4 |
| 2004/0126243 | A1* | 7/2004 | Sievert | B60T 8/4059 |
| | | | | 417/44.2 |
| 2007/0140669 | A1* | 6/2007 | Schanzenbach | G01P 3/46 |
| | | | | 388/811 |
| 2009/0317266 | A1* | 12/2009 | Rampen | F03C 1/0447 |
| | | | | 417/53 |
| 2011/0033322 | A1* | 2/2011 | Barthel | B60T 8/4059 |
| | | | | 417/410.1 |
| 2011/0116939 | A1* | 5/2011 | Kawabata | B60T 8/4031 |
| | | | | 417/253 |
| 2012/0076667 | A1* | 3/2012 | Patient | B60T 8/404 |
| | | | | 417/44.1 |
| 2017/0057667 | A1* | 3/2017 | Ward | F04B 49/065 |
| 2018/0030851 | A1* | 2/2018 | Emmons | F01D 17/12 |

FOREIGN PATENT DOCUMENTS

| | | |
|---|---|---|
| DE | 102005059585 A1 | 6/2007 |
| DE | 202006002734 U1 | 7/2007 |
| DE | 102006040127 A1 | 3/2008 |
| DE | 102008018818 A1 | 10/2009 |
| DE | 102011077480 A1 | 12/2012 |
| EP | 1445161 A1 | 8/2004 |
| JP | 2000242336 A | 9/2000 |
| JP | 2003522678 A | 7/2003 |
| JP | 06165565 A | 6/2006 |
| JP | 2007245803 A | 9/2007 |
| JP | 2008086104 A | 4/2008 |
| JP | 08144634 A | 6/2008 |
| JP | 2008143386 A | 6/2008 |
| JP | 2010255634 A | 11/2010 |
| KR | 1020120110680 A | 10/2012 |
| WO | 2002060734 A1 | 8/2002 |

OTHER PUBLICATIONS

Japan Office Action dated Jan. 24, 2018 for corresponding Japan Patent Application No. 2017-507792.
International Search Report and Written Opinion dated Oct. 5, 2015 from corresponding International Patent Application No. PCT/EP2015/067243.
China Office Action dated May 30, 2018 for corresponding Chinese Patent Application No. 201580043300.0.

* cited by examiner

METHOD FOR DETERMINING A POSITION AND/OR CHANGE IN POSITION OF A HYDRAULIC PUMP OF A MOTOR VEHICLE BRAKE SYSTEM AND MOTOR VEHICLE BRAKE SYSTEM

CROSS REFERENCE TO RELATED APPLICATION

This application claims the benefit of International application No. PCT/EP2015/067243, filed Jul. 28, 2015, which is hereby incorporated by reference.

TECHNICAL FIELD

The technical field relates generally to electrohydraulic brake systems for vehicles.

BACKGROUND

Electrohydraulic brake systems typically include a pump unit that is driven by an electric motor for implementing functions, such as an anti-lock brake system or a driving dynamics controller. For suppressing unwanted noise in the vehicle or implementing situation-dependent working ranges or control functions of the brake system, for example in the case of an emergency or in a mode arranged for comfort, highly accurate knowledge of the position and/or the revolution rate of the hydraulic pump or the rotor of the electrical machine that is provided for driving the pump is desired.

In this regard, in International Application Publication No. WO 02/060734 A1, a unit for detecting the revolution rate of the electric motor for an electronically regulated brake system is described, which comprises at least one sensor for determining the revolution rate of the electric motor or the shaft. Furthermore, the functionality of such an electric motor must be configured so that said motor can meet the requirement that is imposed on the brake system for a given on-board electrical system of a vehicle. A check as to whether said safety requirements are met during the ongoing operation of the brake system is also carried out in a known manner by means of such a position sensor, whereby for example detection of the revolution rate of the hydraulic pump can be carried out.

In particular, for determining the position of the hydraulic pump or of the rotor of the electrical machine that is provided for driving the pump, inductive sensors are used that as a result of the underlying physical measurement principle require frequencies determined by means of a resonant circuit for the operation thereof. This results in limitations for the system clock of the actuating and analyzing microcontroller unit ("MCU") or power control unit ("PCU"), from which running time problems can result during operation.

As such, it is desirable to present a system and/or method that implement the determination of the position of the hydraulic pump or the electrical machine that is provided for operating the hydraulic pump without limitations on the system clock for the actuating and analyzing MCU and/or PCU. In addition, other desirable features and characteristics will become apparent from the subsequent summary and detailed description, and the appended claims, taken in conjunction with the accompanying drawings and this background.

BRIEF SUMMARY

In one exemplary embodiment, a method for determining a position and/or a change of position of a hydraulic pump of a motor vehicle brake system, wherein the hydraulic pump is operated by a pulse modulation actuated electrical machine and the detection of a current measurement signal and/or of a voltage measurement signal of the electrical machine and/or of a load circuit for supplying the electrical machine is carried out, wherein based on the current measurement signal and/or on the voltage measurement signal as well as at least one frequency of the current measurement signal and/or of the voltage measurement signal, which has an essentially integer division ratio with respect to a commutator frequency of the electrical machine, the position and/or change of position of the hydraulic pump is determined and is used for actuating the electrical machine.

In the case of a mechanical commutator, the commutator frequency refers in particular to the frequency with which a brush of the sliding contact changes from one commutator lamella to the next commutator lamella. In the case of electronic commutation of a brushless machine, the commutator frequency preferably means the actuation frequency of an inverter operating the electrical machine.

Advantageously, determining the position and/or the change of position of the hydraulic pump or of the electrical machine that is provided for operating the hydraulic pump is thereby implemented without limitations of the system clock of an actuating and analyzing microcontroller unit ("MCU") and/or a power control unit ("PCU"). A change of position in the context of the disclosure means in particular the detection of changes of angle and/or of a revolution rate and/or of further parameters derived therefrom. Advantageously, running time problems, which occurred as a result of the previous limitations on the system clock because of defined frequencies of the respective sensor, do not occur. Furthermore, the position sensor can be dispensed with, whereby costs, the demand for space and weight can be saved. In addition, in the case of the MCU or PCU, resources can be saved or released that can be provided for other tasks. These are for example the use of pins of the corresponding microcontroller that are released and/or numerous computing steps that are called up by the data acquisition, communications and calculation of the sensor signals. Alternatively, a position sensor can be provided, which is for redundant position detection. Although the aforementioned advantages no longer exist, as a result of the redundancy an increase of the failure safety and thereby of the achievable safety level is achieved, for example according to ISO 26262.

In one embodiment, at least one essentially integer subharmonic of the commutator frequency of the electrical machine is filtered out of the current measurement signal and/or the voltage measurement signal and the amplitude thereof is compared with at least one predetermined limit value. Advantageously, as a result the detection is achieved in particular of signs of wear and/or fouling of the brushes of the electrical machine.

Advantageously, an offset correction to a non-zero value is carried out for the current measurement signal and/or the voltage measurement signal. One advantage of this is that the existence of unrecognized negative currents, in particular in the generator mode of the machine, is detected and can be used for current control.

According to one exemplary embodiment, amplification of a direct component and separate amplification of an alternating component of the voltage signal and/or of the current signal are carried out, wherein at least one amplification factor is controlled and/or regulated in such a way that noise-related effects on the voltage signal and/or the current signal are essentially prevented. Filtering of noise variables from the motor vehicle's on-board electrical system is thereby already carried out advantageously during the measurement data acquisition. The quality of the pre-processing can be increased by this measure.

According to one advantageous embodiment, the current measurement signal and/or the voltage measurement signal is/are compared with calculated variables of an observer model of the electrical machine, wherein the observer model comprises representations of the structural design and non-reversible state variables and reversible state variables of the electrical machine.

The non-reversible state variables are preferably repeatedly adjusted at least during the functional time period of the electrical machine. For example, incorrect fault detections as a result of wear can be prevented thereby.

In one embodiment, the current measurement signal and/or the voltage measurement signal and/or the non-reversible state variables and/or the reversible state variables are compared with predetermined limit values, wherein a specific fault is determined from reaching or exceeding a respective limit value and/or a respective predetermined combination of limit values. One advantage is that thereby the fault detection rate is improved and/or the occurrence of resulting negative consequences can be reduced. Classification in a higher safety level, for example according to ISO 26262, is possible as a result.

Furthermore, the disclosure describes a motor vehicle brake system for determining a position and/or a change of position of a hydraulic pump contained by the motor vehicle brake system, which is configured to operate at least one electrical machine associated with the motor vehicle brake system in a pulse modulated manner, and means are provided for detecting a current measurement signal and/or a voltage measurement signal of the electrical machine and/or of a load circuit for supplying the electrical machine, wherein the motor vehicle brake system is configured so that the position and/or the change of position of the hydraulic pump is/are determined and used for actuating the electrical machine based on the current measurement signal and/or the voltage measurement signal as well as at least one frequency of the current measurement signal and/or of the voltage measurement signal, which has an essentially integer division ratio with respect to a commutator frequency of the electrical machine.

The motor vehicle brake system may comprise a control unit that is configured for operating the electrical machine of a hydraulic pump of the motor vehicle brake system and/or for operating the electrical machine of an electrical parking brake. Advantageously, the electrical machine of the hydraulic pump and the electrical machine(s) of the electrical parking brake are thereby operated by means of the one control unit. The position determination and/or the detection of the change of position of the hydraulic pump as well as the parking brake can also be implemented more accurately than is the case when using a sensor that is provided for the purpose, whereby torques that are to be used can also be controlled more accurately.

For operating the electrical machine of the hydraulic pump and for operating the electrical machine of the electrical parking brake, commonly used hardware and/or software resources of an integrated circuit of the control unit are provided. Advantageously, the result is that functional units and/or software modules that are used for actuating and/or analyzing an electrical machine can also be used for at least one further electrical machine. This results in advantages, in particular regarding costs and the demand for space.

The control unit may comprise at least one microcontroller unit and one power control unit, wherein the commonly used hardware and/or software resources are contained within said microcontroller unit and/or said power control unit.

Preferably, the power control unit, which is in particular configured as a mixed signal circuit, comprises at least one actuation module for pulse width modulated actuation of a switching device for operating the at least one electrical machine and at least one voltage detection device for detecting the at least one voltage measurement signal and/or at least one current detection device for detecting the at least one current measurement signal.

In one exemplary embodiment, the power control unit provides the microcontroller unit with the especially pre-processed voltage measurement signal and/or current measurement signal and/or information derived therefrom by means of at least one communications interface. The microcontroller unit thus advantageously obtains already pre-processed data from the power control unit and is therefore essentially relieved of signal processing tasks. The power control unit can additionally be optimized for the pre-processing, and the data transfer by means of the communications interface can be reduced.

In one exemplary embodiment, respective motor specific parameters are stored in at least one memory contained within the control unit. By the use of parameterization by means of software, the application of existing hardware is advantageously not only designed for a specific configuration with corresponding electrical machines, but can also be easily ported to different system configurations.

The motor vehicle brake system described above may be configured for the implementation of the method described above.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Referring to the Figures, wherein like numerals indicate like parts throughout the several views, a motor vehicle brake system is shown and described herein.

Figure 1:
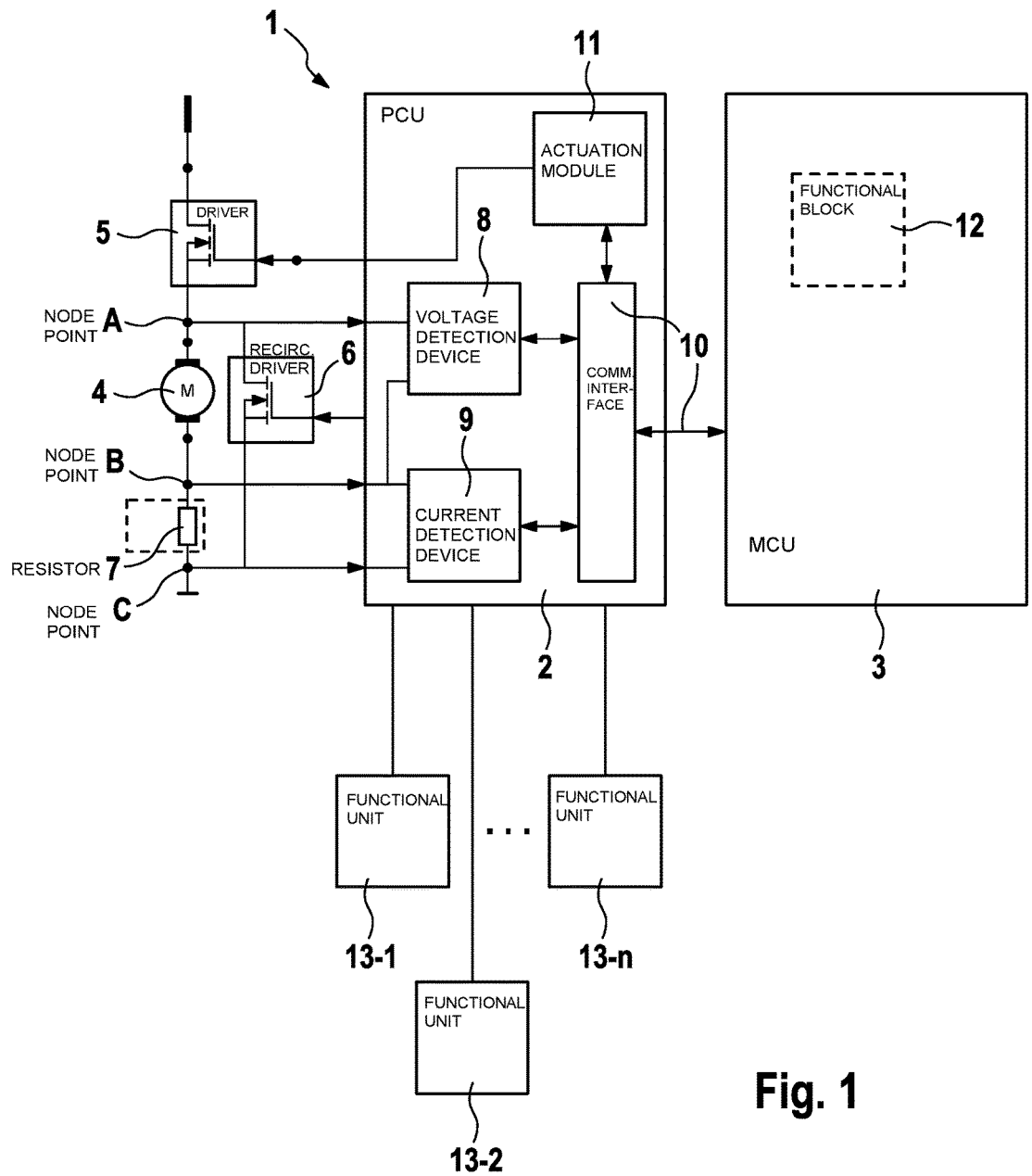
FIG. 1 is a block diagram of an exemplary embodiment of the circuit for an electrohydraulic motor vehicle brake system.

FIG. 1 shows an electrohydraulic motor vehicle brake system with a circuit 1 as an example of the motor vehicle brake system. The representation of further known components of the brake system, such as for example wheel brakes, is omitted; the components are, however, also taken into account within the scope of the disclosure. A power control unit ("PCU") 2 controls a driver 5 by means of actuation modules 11, wherein the driver switches the power path of the power supply of an electric motor 4 of a hydraulic pump of an electrohydraulic brake control unit. The recirculation driver 6, which is also actuated by the PCU 2, is used as a power driver of the recirculation path for pulse width modulated actuation, such as for example is described in German patent publication No. DE 10 2008 055 696 A1 for a valve actuator. The voltage values measured at the node points A and B are used by the voltage detection device 8 for determining the actual voltage of the actuation of the electric motor 4. Using the voltage values at the node points B and C, which reflect the voltage difference across the resistor 7, determining the actual current of the electric motor 4 is carried out by the current detection device 9. The actual voltage can also be detected by the driver 5 or the recirculation driver 6 with the omission of the resistor 7. The voltage and current detection devices 8, 9 include further circuit parts, for example, for filtering or pre-processing. A sensor for detecting the rotor position is not necessary for operating the electric motor 4, but can still be provided, in particular to meet redundancy-safety requirements (for example according to ISO 26262). The actuation and position detection of an electric motor of an actuator of the electrical parking brake 13-1 from the actual current values and actual voltage values, which are also determined with the voltage and current detection devices 8, 9, is implemented by the circuit 1 in a comparable manner. An actuation module 11 also includes commonly used resources according to the exemplary embodiment. Further electrical parking brakes or functional units that include electric motors can also be actuated and analyzed thereby. The same are represented in FIG. 1 by the functional units 13-2 through 13-*n*. Sensors for the position detection of said electric motors are also not necessary in this case, but each can also be provided.

The results of the actual current and actual voltage detection of the electric motor 4 as well as the further electric motors 13-1 through 13-*n* are provided by a communications interface 10 of a microcontroller unit 3 ("MCU"). In this case the MCU 3 comprises a functional block 12, which is representative in particular of software-based computational rules for actuating the electric motors 4, 13-1, etc., wherein the PCU 2 can already provide pre-processed data to the MCU 3. The MCU 3 thus requires no resources for implementing the signal processing but calculates target values for the actuation of the respective electric motor based on the obtained actual values. In addition, as a result the data transfer with the communications interface 10 is reduced, whereby further resources are saved.

The MCU 3 and the PCU 2 can essentially be integrated on a common mixed signal circuit (e.g., a mixed signal integrated circuit) or application specific integrated circuit ("ASIC") while taking into account measures for failure safety or increasing the availability, whereby the analysis and actuation of the electric motors can be bundled in the brake control unit. The result of this is that circuit parts that are provided for the actuation and analysis of the electric motor 4 of the hydraulic pump of the brake system can also be used for the actuation and analysis of further actuators. Furthermore, the integration of said functions can be transferred to the monitoring concept, so that a higher common safety level can be implemented.

The MCU 3 as well as the PCU 2 are optimized for the respective application area such that parameterizing for different electric motors or complete functional units, such as for example brake actuators, is possible in a simple manner. Specific parameters can in particular be stored and loaded in a non-volatile memory, for example an EEPROM, of the electronic control unit of the motor vehicle brake system for this purpose.

A sensor-free motor position detection ("SLP") or sensor-free motor revolution rate detection ("SLN") is carried out according to the exemplary embodiments by analyzing the current ripple and/or voltage ripple of the correspondingly detected actual values and modeling of the electric motor. In order to enable a brief and simple description of the exemplary embodiments, the terms position and revolution rate are essentially used redundantly below. The ripple (relatively small fluctuations of the values) arises as a result of the rotation of the rotor and are preprocessed and analyzed for determining the position of the rotor or the hydraulic pump. During the assessment of the periodically occurring current and/or voltage ripple, signals are used in this regard that have an integer division ratio with respect to the commutator frequency. The integer subharmonics of the commutator frequency are filtered out for this. The revolution rate of the machine or the hydraulic pump can be determined on this basis with knowledge of the machine parameters, for example the geometry, for example by incrementing the ripple that is filtered in such a way. The position results in a comparable way with knowledge of an initial position.

The SLP or SLN is carried out based on the aforementioned, and in one example, by use of three matrices. A first matrix reflects the structural design of the respectively used electric motor 4 through 13-*n*. Wear values that take into account non-reversible changes, in particular by ageing of motor components, are described by a second matrix. For example, this includes the brush resistance as a measure of the wear-dependent brush length and the temperature change gradient as a measure of the wear-dependent cooling connection. The second matrix is regularly adjusted over the functional period of the motor. By means of a third matrix, reversible state variables, such as for example reversible state changes of physical variables as a result of thermal processes, during the operation of the electric motor are described (temperature model). Even if, for example, reference is made to one or more electric motors with commutators, an application with electronically commutated electric motors is also envisaged within the scope of the invention.

For implementing fault diagnosis of the respective electric motor, the values or elements of the second and/or third matrix (reversible and irreversible changes) are compared with predetermined and maximum permissible matrices and/or values for the respective motor and the application-specific thereof. A specific fault can be associated with reaching a certain value or a certain combination of values during this. This can be carried in an absolute or differential manner, in particular depending on the nature of the respective value or the respective values. The fault-specific values are determined in this case, for example before commissioning a respective motor, and are stored in a memory from which they can be read during ongoing operation.

A sudden failure of such an electric motor could endanger the safety of road users. Therefore, if for example the detection or early detection of wear of the brushes of the electric motor is achieved by means of a limit value, a fault indication is carried out in the case of reaching (possibly even before reaching) the limit value or reaching the limit value early in relation to a determination period. Fouling of brushes or of the commutator can be determined from strongly differing brush resistances in combination with current ripple and/or voltage ripple occurring in certain periods. The amplitudes of the filtered frequencies in an integer division ratio with respect to the commutator frequency are compared with at least one corresponding limit value for the detection of said differing brush resistances. If it is assumed therefrom that only individual segments of a commutator are dirty, preferably only the subharmonics are used that approximately correspond to the commutator frequency divided by the commutator segment number.

A further example of a fault diagnosis is the detection of a change of the magnetic remanence of permanent magnets of the motor that may be present. The residual magnetism and/or the characteristic curve of the permanent magnets can be changed by fault-induced current pulses or voltage pulses. During the analysis of actual values of the motor current and/or the motor voltage, the changes are determined, for example, by comparing the actual values with initial values of the motor model and are associated with a specific fault. In a comparable manner, the motor model can be used to detect possible overloading in advance, for example by analyzing actual currents and/or calculated actual resistances of the motor windings and comparing the same with the values of the motor model. Suitable measures are initiated depending on the fault or faults detected in this way.

Figure 2:
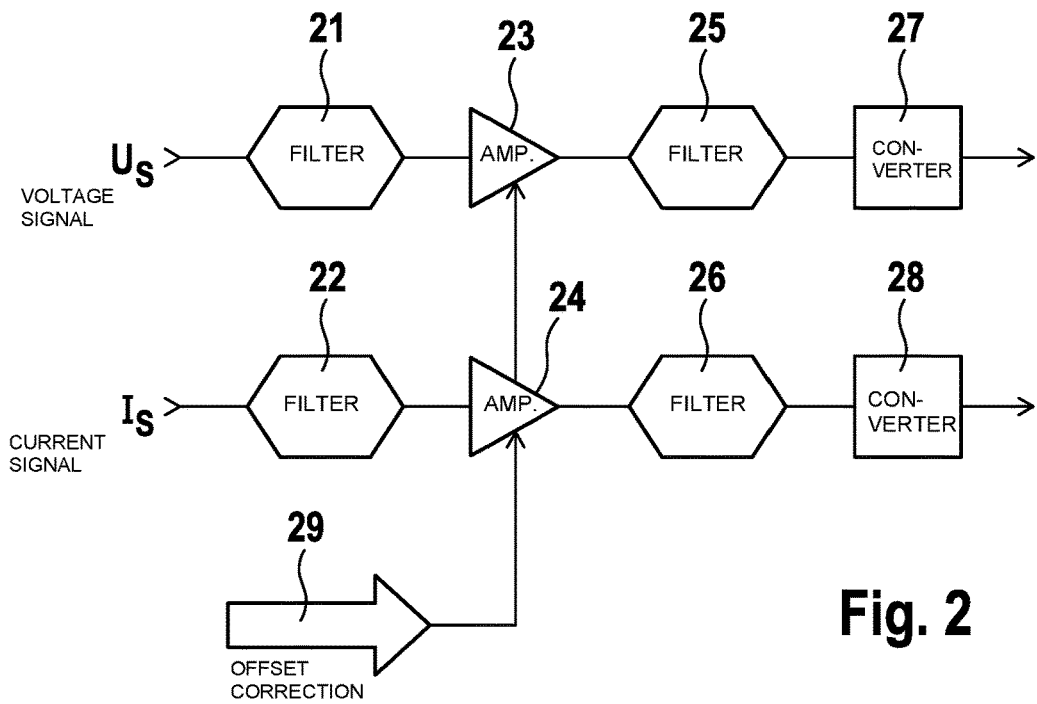
FIG. 2 is an exemplary embodiment of a voltage detection device and a current detection device for pre-processing the measured voltage and current values by means of analog filtering.

FIG. 2 shows an exemplary embodiment of the voltage detection device 8 and the current detection device 9 for pre-processing the measured voltage and current values by means of analog filtering. The actuation of the driver 5 is carried out by pulse width modulation, wherein in particular with the use of a direct current ("DC") converter it must be ensured that the motor current and motor voltage are detected with the correct phase and with sufficient quality. So that the current and voltage values fall within the range of values of the analog to digital converters 7, 8, the detected current signal IS and the detected voltage signal US are amplified by amplifiers 23, 24. Because the signals IS and US comprise different ranges of values, different amplification factors are preferably predetermined. On the output side, the filtered signals are transferred to downstream functional units for further pre-processing (not shown) or by a communications interface 10 to the MCU 3. Alternatively, this method and that described below for signal processing can also be implemented essentially on a software basis by the MCU 3.

Frequencies that are irrelevant to the analysis and that result for example from the PWM clocked actuation, are filtered by filters 21, 22, 25, 26, for which for example a 60 dB attenuation can be provided in a frequency band of 2.5 kHz to 20 kHz. In order to achieve qualitatively adequate filtering, the PWM frequency and the useful frequency for actuating the motor preferably comprise a significant frequency separation of approximately ½ to ⅔ per decade for this, wherein the useful frequency is lower than the PWM frequency. Further noise variables that could affect the measurement, such as for example fluctuations in the on-board electrical system, are also compensated and/or filtered.

The signal processing of the voltage signal $U_S$ and of the current signal $I_S$ is implemented in such a way that the filters 21, 22, at least over the useful frequency range of the motor, preferably have a phase difference of less than or approximately equal to 5° in order to obtain very small time offsets because of the electronic analysis of simultaneously occurring measurement values. This is also true for the filters 25, 26. The phase differences can also deviate from this if time offsets exist as a result of the analog to digital conversion. Larger phase differences than those mentioned can be permitted, in particular if a reduced quality of the method can be tolerated or if there is particularly marked commutation ripple or for example if noise is introduced into the measurement system by means of the on-board electrical system.

During defined times, an offset correction 29 to a non-zero value, for example 10 to 50 LSB, is carried out by amplifiers 23, 24. This is preferably carried out if no requirements are placed on the respective motor by further functions of the brake system. As a result, the existence of unrecognized negative currents in the generator mode of the motor, in particular in the case of strong fluctuations in the on-board electrical system, can be detected and prevented for example by measuring the negative currents and taking them into account during the modeling or by only detecting the presence of the currents and designing the actuation in a fail-safe manner accordingly. For the second case, false results of the model that are caused as a result thereof are tolerated. Furthermore, as a result the functionality of the offset correction circuit can be determined or a fault diagnosis of the analysis circuit can be carried out by taking into account negative drive currents during torque generation. The fault diagnosis capability as well as the accuracy of the modeling can thereby be improved.

Figure 3:
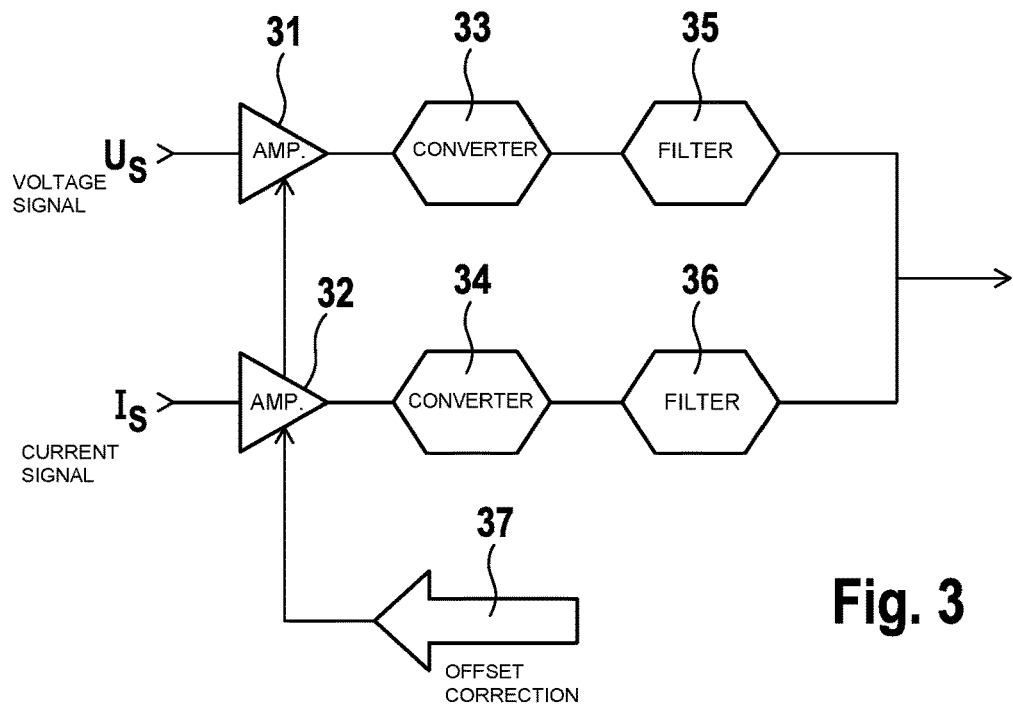
FIG. 3 is an exemplary embodiment of the pre-processing with digital signal processing.

FIG. 3 shows an exemplary embodiment of the measurement value pre-processing and corresponding to FIG. 2, but with digital signal processing, which is thereby particularly suitable for integration within an integrated circuit. Following buffering (not shown) and amplification 31, 32 (see description of the exemplary embodiment of FIG. 2) of the current signal and the voltage signal $U_S$ and $I_S$, a highly synchronous and sufficiently rapid analog to digital conversion is carried out by means of the sigma-delta converter 33, 34. Following this, digital filtering 35, 36 of the digitized signals is carried out, wherein the filters can be designed with smaller phase differences from each other than is the case for discrete embodiments for example. On the output side, the digitized and filtered signals are transferred to downstream functional units for further pre-processing (not shown) or by means of the communications interface 10 to the MCU 3. Also according to said exemplary embodiment, an offset correction 37 is provided.

Figure 4:
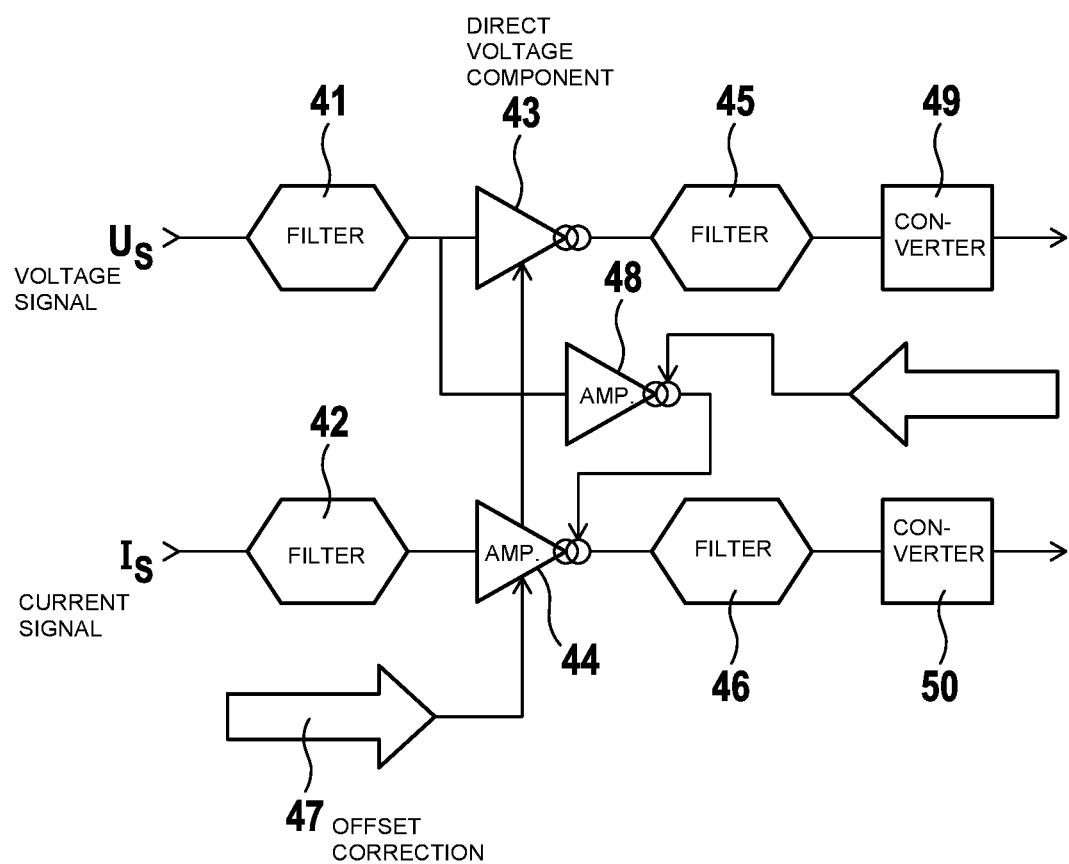
FIG. 4 a further exemplary embodiment of measurement value acquisition, wherein filtering of noise variables from the motor vehicle's on-board electrical system is already carried out during the measurement data acquisition.

In FIG. 4 a further exemplary embodiment of measurement value pre-processing according to the invention is shown in the form of a voltage detection unit 8 and/or a current detection unit 9, wherein filtering of noise variables from the motor vehicle's on-board electrical system is already carried out during the measurement data acquisition. As a result, in particular a simplification of the design of the filters 45, 46 is achieved, because the phase dependency as well as synchronicity of the current signal $I_S$ and voltage signal $U_S$ does not necessarily have to be specified. Furthermore, the sampling frequency for the voltage signal $U_S$ or the current signal $I_S$ can be significantly reduced, whereby fewer computational resources are necessary.

The filters 41 and 42, the offset correction 47, as well as the analog to digital converters 49, 50 comprise essentially the same functions as have been described for the filters 21, 22, the offset correction 29, and the analog to digital converters 27, 28 of the exemplary embodiment of FIG. 2. The sampling rate of the analog to digital converter 49 is preferably lower than the useful frequency for actuating the respective motor. The sampling rate of the analog to digital converter 50 is preferably higher than twice the highest useful frequency for actuating the respective motor. According to the exemplary embodiment of FIG. 4, amplification of the direct voltage component 43 and separate amplification of the alternating voltage component 48 of the voltage signal US are carried out. A subsequent computational cost of filtering the noise by the MCU 3 can thereby be omitted. By means of the alternating voltage amplifier 48, the amplification of the current amplifier 44, in particular using already calculated values of the motor model, is controlled and/or regulated by the MCU 3 in such a way that noise-related effects on the current or the current measurement are levelled out and faults caused by insufficient noise filtering are prevented. In the same way, control and/or regulation of the amplification of the current amplifier 44 depending on the temperature can be provided, wherein in particular the winding resistance of the motor windings that is calculated by means of the motor model, the value of which is provided by the PCU 2, is used as a basis. Said signal preprocessing process enables a calculation that is economical with resources by downstream functional units, such as for example the MCU 3, whereby costs can be saved.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method for determining a position of a hydraulic pump of a motor vehicle brake system, the method comprising:
    operating the hydraulic pump by a pulse modulation actuated electrical machine;
    detecting at least one of a current measurement signal or a voltage measurement signal, where the current measurement signal is of at least one of the electrical machine or a load circuit for supplying the electrical machine, where the voltage measurement signal is of at least one of the electrical machine or a load circuit for supplying the electrical machine;
    determining the position of the hydraulic pump based on at least one of the current measurement signal or on the voltage measurement signal and at least one frequency, where the at least one frequency is of the current measurement signal or of the voltage measurement signal, determining the position of the hydraulic pump based on the current measurement signal or the voltage measure signal and at least one frequency is in an integer division ratio with respect to a commutator frequency of the electrical machine;
    utilizing the determined position of the hydraulic pump for actuating the electrical machine; and
    filtering out at least one integer subharmonic of the commutator frequency of the electrical machine from the current measurement signal or the voltage measurement signal; and
    comparing the amplitude of the current measurement signal and/or the voltage measurement signal with at least one predetermined limit value.

2. The method as claimed in claim 1, further comprising carrying out an offset correction to a non-zero value for the current measurement signal or the voltage measurement signal.

3. The method as claimed in any claim 1, further comprising amplification of a direct component and separate amplification of an alternating component of the voltage signal or of the current signal, wherein at least one amplification factor is controlled and/or regulated in such a way that noise-related effects on the voltage signal or the current signal are prevented.

4. The method as claimed in claim 1, further comprising comparing the current measurement signal or the voltage measurement signal with calculated variables of an observer model of the electrical machine, wherein the observer model comprises representations of the structural design and non-reversible state variables and reversible state variables of the electrical machine.

5. The method as claimed in claim 4, further comprising repeatedly adjusting the non-reversible state variables at least during the functional time period of the electrical machine.

6. The method as claimed in claim 4, further comprising:
    comparing the current measurement signal or the voltage measurement signal or the non-reversible state variables or the reversible state variables with predetermined limit values; and
    determining a specific fault based on reaching or exceeding a respective limit value or a respective predetermined combination of limit values.

7. A motor vehicle brake system for determining a position of a hydraulic pump contained within the brake system that is equipped to operate at least one electrical machine that is associated with the motor vehicle brake system by pulse modulation and means for detecting a current measurement signal and/or a voltage measurement signal of the electrical machine and/or of a load current circuit for supplying the electrical machine are provided, wherein the motor vehicle brake system is designed such that the position of the hydraulic pump is/are determined and used for actuating the electrical machine based on the current measurement signal or the voltage measurement signal and at least one frequency of the current measurement signal or of the voltage measurement signal that is in an integer division ratio with respect to a commutator frequency of the electrical machine.

8. A motor vehicle brake system comprising a control unit configured to determining a position of a hydraulic pump contained within the brake system that is equipped to operate at least one electrical machine that is associated with the motor vehicle brake system by pulse modulation and means for detecting a current measurement signal and/or a voltage measurement signal of the electrical machine and/or of a load current circuit for supplying the electrical machine are provided, wherein the motor vehicle brake system is designed such that the position of the hydraulic pump is/are determined by the control unit and used for actuating the electrical machine based on the current measurement signal or the voltage measurement signal and at least one frequency of the current measurement signal of the voltage measurement signal that is in an integer division ratio with respect to a commutator frequency of the electrical machine.

9. The motor vehicle brake system as claimed in claim 8, wherein hardware and/or software resources of an integrated circuit of the control unit are provided for operating the electrical machine of the hydraulic pump and for operating the electrical machine of the electrical parking brake.

* * * * *